DIFFERENTIAL MATRIX DRIVER

Filed Nov. 15, 1957

3 Sheets-Sheet 1

INVENTORS
Harold E. Tellefsen
Richard I. White
By: Wallenstein & Spangenberg
Attys INVENTORS
Harold E. Tellefsen
Richard L. White
By: Wallenstein & Spangenberg, Attys.

April 11, 1961 H. E. TELLEFSEN ET AL 2,979,700

DIFFERENTIAL MATRIX DRIVER

Filed Nov. 15, 1957 3 Sheets-Sheet 3

INVENTORS.
Harold E. Tellefsen
Richard L. White
By Wallenstein & Spangenberg
Attys United States Patent Office 2,979,700
Patented Apr. 11, 1961

2,979,700

DIFFERENTIAL MATRIX DRIVER

Harold E. Tellefsen, Chicago, and Richard L. White, Skokie, Ill., assignors, by mesne assignments, to Information Systems, Inc., Skokie, Ill., a corporation of Illinois Filed Nov. 15, 1957, Ser. No. 696,804
8 Claims. (Cl. 340—174)

This invention relates to data information systems, and particularly to an improvement in the control means for reading information into and/or out of magnetic core storage units used in such systems for storing binary coded information.

In recent years, great advancements have been made in the development of a magnetic core which have a generally steep rectangular hysteresis characteristic which enables the core to be driven between opposite stable states of magnetic saturation by pulses of proper polarity fed to input windings thereof. The opposite states of magnetic saturation of such cores represent the two possible binary conditions or states of a binary coded bit of information. Usually, a number of such cores are associated together for the storage of a number of bits of binary coded information forming one code group. Each code group is handled in the data information system involved as a unit by sequentially or simultaneously feeding the various bits of a code group into or out of a magnetic core storage unit.

Magnetic core storage units of the type above described are now commonly assembled together into a physical integral unit comprising a large number of rows of magnetic core units, each row storing information on the binary bits of a code group, with the corresponding cores of each row arranged in *a* columns. Such cores each commonly are shaped in the form of an annulus or ring. A first conductor usually threads in a similar manner through all the core units in each row of core units and a second input conductor similarly threads through the core units of each column of core units. The two conductors threading through each of the cores constitute respective groups of serially connected input windings to the cores. Usually, an output conductor threads through all of the cores in a zig-zag fashion to constitute a number of serially connected output windings connected to a common output. An arrangement of core units and windings as above described is often referred to as a magnetic core matrix.

In a magnetic core matrix, a particular core may be set to a given state of magnetic saturation by either feeding current pulses through one of the above mentioned windings or conductors which current pulses have the required magnitude to trigger the core from a preset to an opposite of magnetic saturation, or else a current pulse of half the required magnitude is fed to both of the above mentioned input windings or conductors in a manner such that the fluxes produced thereby are an aiding relation. Usually, the latter method is utilized to trigger the core. In such sase, such a core may be triggered from a reference or first state of magnetic saturation to a second or opposite state of magnetic saturation by simultaneously feeding what may be referred to as half-current pulses of a given polarity to the input windings or conductors thereof. The core may be returned to the reference state of saturation by feeding half-current pulses of opposite polarity through the input windings or conductors thereof. Whenever the core is triggered from one state of saturation to the other, a pulse appears in its output winding due to the change of flux in the core during the change in magnetic state thereof, the polarity of such pulse depending upon the direction or change of the state of saturation thereof. If a row of core units of the matrix is preset to conform to a given binary code group some of the cores being in the reference state of saturation and others being in the other or second state of saturation, and the input conduction of the cores are sequentially fed with half-current pulses of a polarity which are capable of driving the cores from the reference to the opposite state of saturation, each core which was initially set to the reference state of saturation will have a pulse induced in the common output conductor as its magnetic state is changed by the half-current pulses, whereas any core already set to the second or opposite state of saturation will not have a pulse produced in the common output conductor. The presence or absence of a pulse in the common output conductor at a particular instant time in a scanning period represents the two possible binary output conditions of the core matrix at such instant.

Among the primary objects of the present invention are: To provide a new and improved circuit for reading information into and/or reading information out of a magnetic core storage unit or units, which is simpler and more reliable than prior circuits heretofore used for similar purposes; to provide such a circuit wherein the original magnetic state of a core storage unit from which information has just been transferred may be restored or reset to their original preset state in a simpler, more reliable manner than was heretofore the case; and to provide such a circuit wherein magnetic core-type components are used in the control circuits involved in reading information into and/or out of a magnetic core store unit or group of such units arranged to form a magnetic core matrix, so as to take advantage of the compactness, simplicity, reliability and low cost of magnetic core type control components.

In accordance with one aspect of the invention, the read-in, read-out, and restore operations are carried out through the use of one or more so-called differential transformer units associated with each core storage unit rather than by use of the more costly and less reliable transistor, relay or vacuum tube control components as was heretofore the case. Each of the differential transformer units has a pair of input windings and an output winding wound around a core of magnetic material, preferably having a rectangular type hysteresis characteristic providing a bi-stable magnetic storage unit with opposite states of magnetic saturation. The two input windings are preferably differentially wound upon the core and have corresponding ends to be referred to as signal input ends, which, when fed with current pulses of the same polarity, produce magnetic flux in opposite direction in the core.

The other corresponding ends of the input windings may be connected together and then to ground or other common point through an impedance, to be referred to sometimes as an inhibit input impedance. If said pulses each have sufficient energy to drive the core between opposite states of magnetic saturation, then the pulses produced in the output winding of the transformer unit thereby will produce output pulses of opposite polarity. In the case where the present invention is applied to a magnetic core storage matrix where, as above described, each row of core units has an input conductor threading therethrough and each column of core units has a separate conductor threading therethrough, a differential transformer unit is associated with each column of core units and a differential transformer unit is provided for a selected row of core units.

Although, theoretically, at least, a separate transformer core unit may be provided for each row of core units, in its most preferred form, the present invention contemplates the use of only one such differential transformer unit which is sequentially coupled to the various rows of core units. The output winding of each column transformer unit is connected to one of the input conductors threading through the cores of the associated column, and the output winding of the row transformer unit is connected to the input conductor threading through the cores of the selected row of cores.

During a read-out operation, the signal input ends of corresponding input windings of the selected column differential transformer units and the row transformer unit, said windings to be referred to as set input windings, are simultaneously fed with respective set pulses of the same polarity which drive the cores of the differential transformer units from a reference to a second or opposite state of saturation. Current pulses, so-called half-current pulses as above defined, are induced in the respective output windings of these transformer units which provide current flow through the two input conductors of the associated core storage unit which provide aiding fluxes which are capable of triggering the core unit from a reference state of magnetic saturation to a second or opposite state of magnetic saturation. Of course, if the core unit is already in the latter state of magnetic saturation, then the half-current pulses flowing through the input conductors thereof will have no effect. For a core unit triggered from a reference to a second state of saturation, an output pulse will be produced in its output winding which comprises that portion of said common output conductor threading therethrough, where a conventional type of magnetic core matrix is involved.

Delay means is provided for delaying the last mentioned output pulse a given basic time period, and the delayed pulse is fed to the signal input end of the second or other input winding of the row differential transformer unit to be referred to as a reset winding, to reset the associated core to its reference state of saturation. A restore or reset pulse coincident with said delayed pulse is fed to the second or other input winding of the column differential transformer unit, to be referred to as a reset winding.

Due to the differential winding of the two input windings of the differential transformer units, the reset pulses fed to said reset windings of the last mentioned differential transformer units will reset the associated cores back to said reference state of saturation and thereby induce pulses in the output windings of these transformer units which are of opposite polarity to the pulses induced therein when these cores were triggered into their second or opposite states of saturation. The latter pulses provide current pulsations in the two input conductor windings of the selected magnetic core storage unit which flow in opposite directions to the previous current pulsations fed therethrough during the set operation of the transformer units, so that the core storage unit involved is triggered from its second or opposite state of saturation back to its first or referenced state of saturation, thus performing a reset or restore operation where the previous magnetic state of saturation of the core unit is restored. The pulse induced in the output winding of the core storage unit involved during the reset operation is eliminated from the output circuit of the matrix by suitable rectifying means. It can be seen that only those cores originally in said reference state of saturation will provide a useful output pulse during the simultaneous pulsing of the set windings of the differential transformer units involved.

The circuit of the present invention is such that the same differential transformer units are utilized for a read-in as well as a read-out operation. Where a read-in operation is involved, of course, any output device to be driven by the magnetic core matrix is disconnected from the output thereof. Also, the same initial feeding of set pulses to the set input windings of the differential transformer units is provided as in the case of the above described matrix read-out operation to set the core storage unit involved into the second state of magnetic saturation. The change of a magnetic core of a core storage unit of the matrix from its first to its second state of saturation will generate an output pulse which, unlike the output pulse in the read-out operation, is not used to reset the row transformer unit and the magnetic core storage unit where it is desired to set the core unit to the binary state represented by its second state of saturation. To this end, inhibiting means is provided for preventing the delayed matrix output pulse fed to the second or restore winding of the row differential transformer unit from triggering the latter transformer unit from its second back to its reference state of saturation, which prevents the generation of a half-current pulse in its output winding, which could reset the magnetic core storage unit. This inhibiting action may be readily provided by means including said above mentioned inhibit input impedance connected to the commonly connected ends of the set windings of the row differential transformer unit. Thus, when it is desired to set the core storage unit involved in a second or opposite state of saturation, an inhibit pulse is fed across the inhibit input impedance of the row transformer unit simultaneously with the feeding of the delayed output pulse of the storage matrix to the reset input winding of the row differential transformer unit.

As above indicated, where a core storage unit is initially set to the second or opposite state of saturation, no output pulse is produced therein when the set input windings of the row and column differential transformer units are initially triggered from their reference to their opposite states of saturation. During a reset operation, therefore, it is obviously necessary to inhibit the effect of a matrix output pulse on the row transformer unit involved since it receives no such pulse. However, it is still necessary to reset the row differential transformer unit core, and this may be accomplished by feeding a restore pulse to its reset winding at a time when a reset pulse is not being fed to the reset winding of the column differential transformer unit involved, so that the half-current pulse generated in its output can have no effect on the matrix core storage unit involved.

In accordance with another aspect of the invention, during a read-in or a read-out operation the set windings of the column differential transformer units are sequentially pulsed by means of a delay means which has a number of successive pairs of signal terminals, one terminal of each pair being a set pulse terminal, and the other terminal of each pair being a reset pulse terminal. When a single input pulse is fed to the delay means, pulses appear in sequence at the first pair of terminals, the said set terminal thereof receiving its pulse first, and thereafter the other pairs of terminals receive pulses similarly in sequence so that the set and reset windings of the transformer units of each row of transformer units receive pulses in time sequence for effecting a sequential read-in or read-out of information from the magnetic core storage units.

Since only half-current pulses are generated in the output windings of the row transformer units, as above explained the read-in or read-out operations additionally require the pulsing of the set winding of the row transformer unit coincident with the pulsing of the set and reset windings of the column transformer units. To substantially reduce the amount of components necessary in the system, a pulse delay and circulating means is preferably provided for the row transformer unit which, subsequent to the feeding of the initial set pulse simultaneously to the row transformer unit and the first column transformer units, delays the set pulse fed to the row transformer unit and feeds the delayed pulse back to the set winding of the row transformer unit at a time coincident with the pulsing of the set winding of the next column transformer unit. The pulse delay and circulating means repeatedly delays and recirculates the initial set pulse, so that all of the core storage units of the selected row of units are sequentially set. The delay and circulating means also includes a signal output terminal in which a pulse appears spaced from the initial or recirculated set and a time interval somewhat greater than the time interval between the occurrence of set and reset pulses between at each of the various pairs of signal terminals of the delay means associated with the column transformer units, so that the row transformer unit can be reset out of synchronism with and subsequent to the resetting of a column transformer unit. Thus, the half-current pulse generated in the output of the row transformer unit has no effect upon the magnetic core storage units, since it occurs when no half-current reset pulse is generated in the output of a row transformer unit.

Other aspects of the invention relate to the novel and unique delay means used for pulsing the set and reset windings of the row and column differential transformer units. As will appear, this delay means comprises magnetic core elements arranged to obtain the advantages of simplicity, low cost, and reliability.

Other objects, advantages and features of the various aspects of the present invention will become apparent upon making reference to the specification to follow, the claims and the drawings, wherein:

Figure 1:
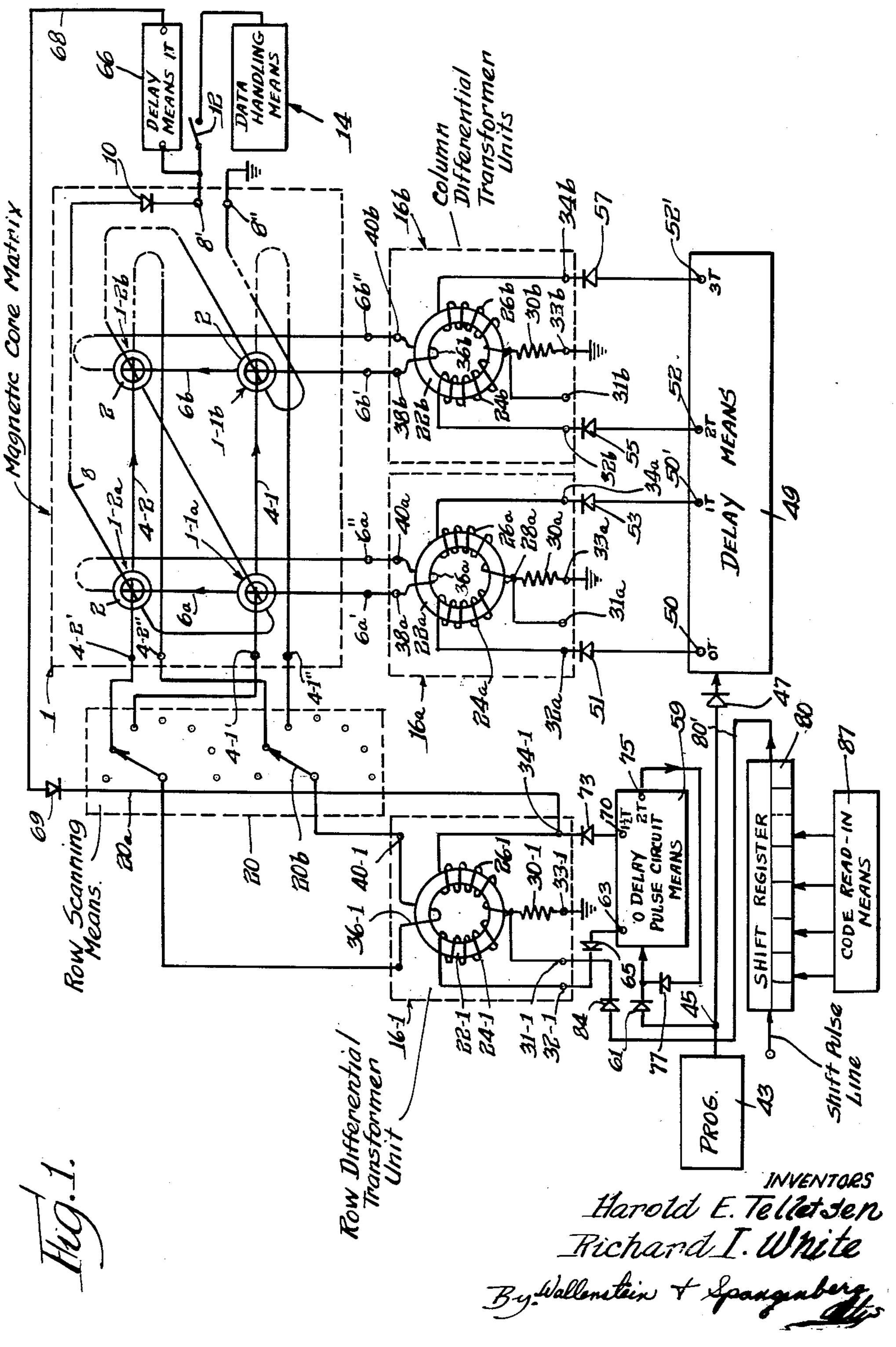
Fig. 1 is a simplified diagram of the components making up the magnetic core matrix control circuit of the present invention.

Referring now more particularly to Fig. 1, a magnetic core stroage matrix 1 is shown comprising a number of rows of magnetic core storage units, only two such rows being shown with two core units per row. It should be understood that, normally a matrix will comprise a large number of rows of such core units, and with as many as ten or more cores per row. Core units **1–1*a* and 1–1*b* are shown in the first row and core units 1–2*a* and 1–2*b* are shown in the second row. Each of the core units comprises a ring-shaped core 2 made of magnetic material having a rectangular-type hysteresis characteristic exemplified by the hysteresis curve shown in Fig. 3. Such a core unit has opposite stable states of magnetic saturation S and S′ which can be respectively obtained by momentarily generating magnetic flux in opposite directions therein. Respective row conductors 4–1 and 4–2 thread through the two rows of core units and the ends of the row conductors respectively connect with input terminals 4–1′, 4–1″ and 4–2′ and 4–2″. These conductors each represent serially connected input windings for the core units in each row. Threading similarly through the corresponding core storage units of each row, which form respective columns of magnetic core storage units, are respective column conductors 6*a* and 6*b*. The ends of these column conductors are connected to respective input terminals 6*a*′–6*a*″ and 6*b*′–6*b*″**, and each column conductor forms serially connected input windings for the core units of the associated column of core units. If so-called half-current pulses flowing in the direction indicated by the arrows in Fig. 1 are fed simultaneously through the row and column conductors of a particular core unit, the flux produced in the core by these currents would be in aiding relationship within the core and would trigger or drive the core from a first or reference state of magnetic saturation to a second or opposite state of magnetic saturation. Conversely, if opposite half-current pulses are sent through the row and column conductors of a particular storage unit, such core will be driven from said second or opposite state of saturation back to said first or reference state of saturation. The flux produced by a half-current pulse flowing only through one of the input conductors associated with a particular core is insufficient to drive the core between opposite states of saturation.

If a particular core unit is driven between its opposite states of magnetic saturation, a pulse is induced by the change of magnetic flux in an output conductor 8 which similarly threads through each of the cores 2 of the matrix. The conductor extends in zig-zag fashion, as illustrated, and may be said to represent a set of serially connected output windings for the various core units of the matrix. A rectifier 10 is inserted in series with the output conductor 8 so as to remove from the output of the matrix 1 any pulse resulting from the triggering of a core storage unit from said second back to said reference state of magnetic saturation. Therefore, only pulses of one polarity may appear in the output of the matrix resulting from the driving of a core storage unit from said reference to said second or opposite state of magnetic saturation. The rectifier 10 is connected to an output terminal 8′ of the matrix and the end of the output conductor 8 opposite to the end associated with the rectifier 10 is connected to a terminal 8″. The latter terminal is grounded and the former terminal may be connected through a set of relay-controlled contacts 12 to suitable data handling means 14 which is to receive information from the mangetic core storage matrix. The contacts 12 are closed during a read-out operation of the core matrix and are open during a read-in operation of the matrix.

In accordance with one aspect of the present invention, read-out and/or read-in operations on the matrix are effected through the use of differential transformer units instead of, for example, vacuum tubes, transistors and the like, which are relatively expensive and unreliable for the degree of reliability and current rating required relative to the differential transformer units to be described. Column differential transformer units such as **16*a* and/or 16*b* are associated with the respective columns of magnetic core storage units of the matrix, and a single row differential transformer unit 16–1 is preferably provided for the rows of core storage units through use of scanning switch means 20 which sequentially connects the transformer unit 16–1 to the various rows of magnetic core storage units of the matrix. Although various types of scanning means may be utilized, for purposes of simplicity, a mechanical type of scanner has been shown comprising two-ganged stepping-switch sections 20*a* and 20*b*** with wipers which may be advanced one stationary contact at a time by a suitable stepping switch solenoid, not shown.

Column transformer unit **16*a* will now be described, it being understood that all of the other differential transformer units 16*b* and 16–1 may be similarly constructed. The corresponding elements of the transformer units are similarly numbered except for distinguishing characters at the ends of the reference numbers. The transformer unit 16*a* is constructed as an integral plug-in unit including a core 22*a* preferably in the ring shape shown and made preferably of a material having the rectangular-type hysteresis characteristic exemplified by the curve of Fig. 3. However, the broader aspects of the invention contemplate the use of ordinary transformer core materials where the core is not necessarily ever driven to saturation as is the case with cores with rectangular hysteresis curves. The core 22*a* thus may have two opposite stable states of magnetic saturation each of which may be obtained by generating a momentary pulsation of magnetic flux through the core of proper energy content and polarity to drive the core from one stable state of magnetic saturation to the opposite stable state of magnetic saturation. To effect this end, a pair of input windings 24a and 26a are wound around the core 22a, the input winding 24a being what will be referred to as a set winding and the other input winding 26a being what will be referred to as a reset winding. These windings are preferably differentially wound around the core so that upon feeding of current pulses of the same polarity to one of the corresponding ends of these windings, in the circuit of Fig. 1 the upper ends thereof, will produce magnetic flux flowing in opposite directions through the core. The other or bottom ends of these input windings are connected together as at 28a, and this junction point is preferably connected to ground through an inhibit input impedence 30a and a plug-in terminal 33a. The junction point 28a is connected to a plug-in terminal 31a. The first mentioned or upper ends of these windings are respectively connected to plug-in terminals 32a and 34a. Terminal 32a associated with the set input winding 24a will be referred to as a set input terminal and the plug-in terminal 34a** associated with the reset winding will be referred to as a reset input terminal.

In addition to the aforementioned input windings 24a and 26a, the transformer unit 16a further includes an output winding 36a having substantially less turns than windings 24a and 26a. For example a ten to one step-down ratio has been found to be satisfactory. The output winding is connected between plug-in terminals 38a and 40a. Terminals 38a and 40a are connected respectively to the input matrix terminals 6a' and 6a'' associated with the first column conductor 6a of the matrix. The corresponding transformer output terminals 38b and 40b of column transformer unit 16b are respectively connected to the column input matrix terminals 6b' and 6b'' associated with the second row conductor of the matrix. The corresponding output terminals 38–1 and 40–1 of the row transformer unit 16–1 are respectively connected through the wipers of the switch sections 20a and 20b to the row input conductors 4–1' and 4–1'' or 4–2' and 4–2'' of the row conductors 4–1 and 4–2 of the matrix.

When, say, a positive pulse of proper energy content is fed to the transformer set terminal 32a, 32b or 32–1, the transformer core involved will be driven from what will be referred to as a first state or reference state of magnetic saturation to an opposite or second state of magnetic saturation. This induces a voltage pulse in the output winding 36a, 36b or 36–1 which will produce a current pulsation flowing in the direction indicated by the associated arrow shown in Fig. 1. This current pulsation will have a magnitude of one-half the magnitude necessary to drive any of the core storage units of the matrix from its reference to its second or opposite state of magnetic saturation, and, as above indicated, will therefore be referred to as a half-current pulse. When a positive driving pulse appears at the transformer reset input terminal 34a, 34b or 34–1, this will drive the associated core from said second or opposite state of magnetic saturation to said first state of magnetic saturation. In such case, a voltage will be induced in the associated output winding 36a, 36b or 36–1 which produces a current pulse flowing in the direction opposite to that shown by the associated arrow in Fig. 1. This current pulse has a magnitude of one-half that necessary to drive the cores of the matrix involved from said second or opposite state of magnetic saturation to said reference or first state of magnetic saturation thereof.

When a column transformer unit and the row transformer unit are simultaneously set to their second state of magnetic saturation, the half-current pulses generated thereby will drive the core storage unit involved from its reference to its opposite or second state of magnetic saturation if the core is initially in the reference state of saturation. Otherwise, coincidence of these half-current pulses will have no effect on the core involved. As above explained, this triggering of any core of the matrix will result in the generation of a useful output pulse at the output terminal 8' of the magnetic core matrix.

When the reset windings of a column transformer unit and the row transformer unit are simultaneously fed with reset pulses which reset the associated cores back to their reference states of saturation, they will generate half-current pulses in their outputs which flow in opposite directions through the associated matrix row and column conductors. These are in opposite directions to that shown by the arrow in Fig. 1. Such simultaneous occurrence of half-current pulses in the input conductors of a matrix core storage unit will reset it from its second state of magnetic saturation back to its reference state of saturation. When the resetting of a core storage unit is not desired, then the resetting of one of the differential transformer units involved is inhibited or delayed so that half-current pulses are not simultaneously generated in the row and column transformer units involved.

When information is being read into the magnetic core matrix, column conductors *6a*, *6b*, etc. are sequentially pulsed with set pulses to drive or maintain the cores involved to their so-called second states of magnetic saturation, which will represent the binary digit 0. If it is desired to maintain or set the core permanently to such a binary designation, then the resetting of the row transformer unit 16–1 simultaneously with the resetting of the column transformer units is inhibited by pulsing the input inhibit impedance 30–1 of the row differential transformer unit with a voltage pulse which cancels out the effect of the voltage pulse fed to the reset input terminal 34–1 thereof.

During a read-out operation of the matrix, the magnetic core storage unit which is set to its reference state of saturation will be driven to its opposite state of saturation when the row and column transformer units are being set, so that a pulse output appears as a result thereof at the output terminals of the matrix. It is often desirable to restore the originally read-in binary code groups in the matrix so that a resetting operation is only needed for those core storage units which were originally set during a read-in operation to the reference state of saturation, because only the magnetic states of these core units are changed by the set pulsing of the transformer units during a read-out operation. This is accomplished in part by using the output pulses generated by the set pulsing of the transformer units during a read-out operation to effect a resetting of the core units from which the pulse originated. Suffice it to say at this point, whenever a pulse appears at the output of the core matrix during a read-out operation as a result of the triggering of a magnetic core storage unit from its reference to its opposite state of saturation, this pulse is delayed and then later fed back to effect the resetting of the row differential transformer 16–1 at the same time that the column transformer unit is reset, so that the resulting simultaneously generated half-current pulses in the transformer outputs drive the core unit involved from its second back to its reference state of saturation. Since a core which was originally in its second or opposite state of magnetic saturation does not produce a pulse in the output of the matrix during the set pulsing of the transformer units, no pulse will be generated to effect the undesired resetting of the row differential transformer unit in synchronism with the resetting of the column differential transformer unit involved.

The means by which the precise timing of the pulsing of the set and reset windings of the various transformer units is obtained will now be briefly described.

The timing of the start of a read-in or read-out operation may be controlled in any well known manner, using a control means commonly referred to as a programmer.

The programmer is identified by the reference numeral 43. When a read-in or read-out operation is desired, a pulse is fed from this programmer to an input terminal 45. When a read-in operation is involved, the programmer may also feed a pulse to suitable relay or other control means, not shown, which effects the opening of the above mentioned contacts 12 leading to the data handling means, so that the output of the magnetic core matrix is disconnected from the data handling means 14. If a read-out operation is desired, the programmer will effect the closure of the contacts 12. The pulse appearing at the input terminal 45 may be coupled through an isolating rectifier 47 to the input of a delay means 49 which, in the broad aspect of the present invention, may be any suitable kind of delay means capable of producing pulses in time sequence at various pairs of output terminals 50–50′, 52–52′, etc., the first terminal of each pair of terminals being a set pulse terminal and the other terminal thereof being a reset pulse terminal. The set pulse terminal 50 first receives a pulse and is connected through an isolating rectifier 51 to the set input terminal 32*a* of the differential transformer unit 16*a* associated with the first column of the matrix. Although the terminal 50 is shown as a terminal apart from the input to the delay means 49, terminal 50 may actually be the same as or connected directly to the input to the delay means 49.

A fixed time interval after the set pulse output terminal 50 receives its control pulse, the second or reset pulse terminal 50′ of the first pair of terminals of the delay means receives a pulse which is coupled through an isolating rectifier 53 to the reset input terminal 34*a* of the first column differential transformer unit 16*a*. The time delay between the appearance of the pulses at the terminals 50′ and 50 may be referred to as a unit time, identified in Fig. 1 by "T." One basic time period after the reset pulse output terminal 50′ receives its control pulse, that is at time period 2T from the appearance of the pulse at the first set pulse terminal 50 of the delay means, a pulse appears at the first or set pulse output terminal 52 of the second pair of terminals of the delay means. This terminal 52 is connected through an isolating rectifier 55 to the set input terminal 32*b* of the second column differential transformer unit 16*b*. One basic time period later, namely, at time 3T, from the time the first pulse output terminal 50 receives a pulse, the second or reset pulse output terminal 52′ of the second pair of terminals of the delay means receives a pulse which is coupled through an isolating rectifier 57 to the reset input terminal of the second column transformer unit 16*b*. Although the delay means 49 may be one of a number of commonly known delay lines, in accordance with the preferred aspect of the present invention it is a magnetic core delay circuit of the kind which will be described hereinafter.

It is thus apparent that the various set and reset windings of the respective column transformer units 16*a*, 16*b*, etc. are sequentially pulsed to effect the generation of the various set and reset pulses above described. As above indicated, the set winding 24–1 of the row differential transformer unit 16–1 is to receive set pulses coincident with the appearance of set pulses at the set input windings of the various column transformer units 16*a* and 16*b*. To effect this result in the simplest and most effective manner, a time delay and pulse recirculating means 59 is provided. This means may include a delay circuit similar to delay means 49, except that it has much fewer signal output terminals as will appear from the description to follow. The input of the delay and pulse recirculating means 59 is connected to the above mentioned common input point 45 which receives control pulses from the programmer 43. Only one control pulse appears at the terminal 45 during any given read-in or read-out cycle. This pulse is fed through an isolating rectifier 61 to the input of the delay and pulse circulating means 59. The latter has a first set pulse output terminal 63, which is connected through a rectifier 65 to the set input terminal 32–1 of the row differential transformer 16–1. A pulse appears at the set pulse output terminal 63 at the same time that the input pulse originating at the common input terminal 45 reaches the first set pulse output terminal 50 associated with the said input winding of the first column differential transformer unit 16*a*. Thus, both row differential transformer unit 16–1 and the column differential transformer unit 16*a* are set at the same instant of time. This results in the generation of core set pulses at the output of the transformer units which set the magnetic core units in the manner above explained.

The delay and pulse circulating means 59 does not have a reset pulse output terminal at which a pulse appears at time 1T after the pulse at the associated set pulse output terminal 63, as the second terminals 50′ and 52′ of the various pairs of signal terminals of the delay means 49, because, as above indicated, the row differential transformer unit 16–1 receives its 1T reset pulse, if at all, from the output of the magnetic core matrix. Assuming that the magnetic core storage unit involved of the first column of magnetic core storage units of the matrix was initially in its reference state of saturation so that the setting of the transformer units 16–1 and 16*a* resulted in the driving of the core storage unit from its reference to its opposite states of saturation, a pulse appears at the output terminal 8′ of the magnetic core matrix at time 0T that is, at the time when the latter transformer units are set. If a read-out operation is involved, this pulse would be coupled through the normally closed contacts 12 to the data handling means 14. Also associated with the output of the magnetic core matrix is a third delay means 66 whose input is connected to the output terminal 8′ of the matrix. The delay means 66 delays the pulse input thereof one basic time unit, that is 1T. The output of the delay means 66 is connected via a line 68 and a rectifier 69 to the reset input terminal 34–1 of the row differential transformer unit 16–1. Thus, one basic time period after the row transformer unit 16–1 is set, a reset pulse is fed to its reset winding if the matrix core storage unit involved is triggered from its reference to its second or opposite state of magnetic saturation. If a read-out operation is involved, where it is desired to reset the above mentioned matrix core storage unit back to its reference state of magnetic saturation to maintain the stored information in the matrix, then the resetting of the transformer unit 16–1 at the same time that the first transformer 16*a* is reset by the reset pulse fed to delay means 49 will effect the restoring or resetting of the core storage unit involved in the manner above explained. If, however, a read-in operation is involved, and it is desired to set the core unit involved to the second state of magnetic saturation, then the reset pulse fed back from the output of the magnetic core matrix is rendered ineffective or inhibited. The manner in which this inhibition is obtained will be explained later on. But, suffice to say at this point, at time 1T a pulse is fed to the inhiibt signal input terminal 31–1 which pulse appears across the signal inhibit impedance 30–1. This pulse is of a polarity and magnitude to cancel out the voltage pulse applied to the reset input terminal 34–1 from the output of the magnetic core matrix.

Now, if the magnetic core storage unit involved was initially in its second or opposite state of magnetic saturation, then the pulsing of the set windings of the transformer units 16–1 and 16*a* will not effect the change of the magnetic state of the matrix core storage unit involved, so that a pulse would not appear in the output of the magnetic core matrix. Some means must, therefore, be provided for resetting the row differential transformer unit 16–1 if it is not reset by a pulse fed from the output of the magnetic core matrix. This means includes a second output terminal 70 of the delay and recirculating means 59 which receives a pulse as a result of the feeding of the input pulse to the delay means 59 sometime after time 1T but before time 2T when the second column differential transformer unit is to be set. Thus, terminal 70 may receive a pulse at time 1½T after the terminal 63 reecives its set pulse. The pulse at the terminal 70 is connected via an isolating rectifier 73 to the above mentioned reset input terminal 34–1 of the row differential transformer unit 16–1.

At time 2T after the set pulse output terminal 63 receives its set pulse, a pulse appears at a feed-back terminal 75 of the delay and pulse circulating means 59, which pulse is fed back to the input of the delay and pulse circulating means 59 through an isolating rectifier 77. In the example being described, it is assumed that no time delay exists between the appearance of a pulse at the input of the delay and circulating means 59 and at the first terminal 63 thereof. Consequently, the row differential transformer unit 16–1 will be set at the same time that the second column differential transformer unit 16*b* is set so that simultaneous half-current pulses are generated therein which are fed to the matrix core storage unit involved.

In the case where a read-in operation is in effect, two possible conditions of operation may be present. One is when it is desired to set the particular matrix core storage unit to a reference state of saturation, which it is assumed will represent the binary symbol 1, and the other when it is desired to set the matrix core storage unit involved to its second magnetic state of saturation, which represents the binary symbol 0. If the binary symbol 1 is desired, then the matrix core storage unit involved must be reset or restored to a reference state of saturation, whereas if the binary symbol 0 is desired the resetting of the row transformer unit 16–1 at time 1T must be prevented or inhibited. This means for inhibiting the resetting of the row transformer 16–1 at time 1T will now be described in more detail. The inhibiting means includes, for example, any well known type of shift register 80. The shift register 80 is a well known control device, which may be a magnetic core device, comprising a number of stages in which binary coded information is stored and when the feeding of shift pulses thereto will result in the sequential feeding of the code one bit or code turn at a time to an output line 80′. The output line 80′ is connected through a rectifier 84 to the inhibit terminal 31–1 of the row transformer unit 16–1.

The shift register may have the same number of stages as the number of core units in the row of core units of the matrix 1. In the form of the invention being discussed, the code stored in the shift register 80 will be the inverse of the code actually desired in the magnetic core matrix. It will be assumed that the presence of a pulse represents the binary symbol 1 and the absence of the pulse represents the binary symbol 0. Now, if the code group desired to be read into the matrix 1 is a code group 11100, then the code stored in the respective stages of the shift register 80 will be 000111, the last stage thereof containing the first bit 0, and the first stage containing the last bit 1. As each shift pulse is received by the shift register 80, the code stored therein shifts one stage toward the last stage, with the code bit last appearing in the last stage being transferred to the output 80′ of the register in the form of a pulse or no-pulse condition. Thus, when the first shift pulse is fed to the shift register 80, no-pulse (0) will appear at the output thereof since the last stage then contains the binary bit 0.

It can thus be seen that if the shift pulses fed to the shift register 80 are synchronized with the appearance of reset pulses at the reset pulse output terminals 50′, 52′ (i.e. at time 1T, 3T, etc.) during the reading-in of information to the matrix 1, that the resetting of the row transformer unit at times 1T, 3T, etc., will occur only when the binary code bit to be read-in to the core storage units involved is 0 because the presence of an inhibit pulse at the output of the shift register inhibits the resetting of the matrix core storage unit involved to its reference or 1 state.

The shift register stages may themselves be initially set to a particular code group by any suitable code reading-in means generally indicated by reference numeral 87. Such code read-in means are well known in the art and need not be described in this specification.

Figures 2, 5:
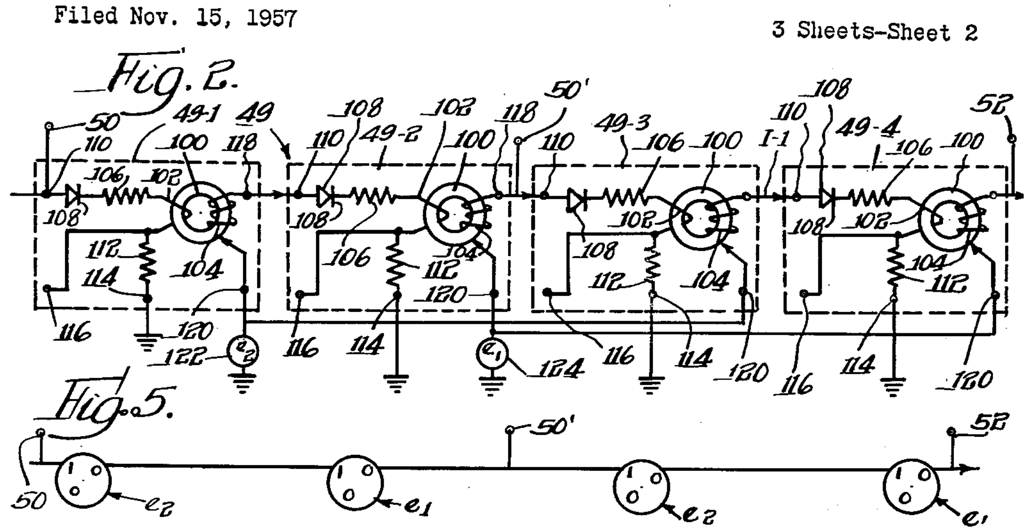
Fig. 2 is a circuit diagram showing the construction of the magnetic core elements making up the above mentioned delay means.
Fig. 5 shows a simplified diagram representing the circuit of Fig. 2.
Figure 4:
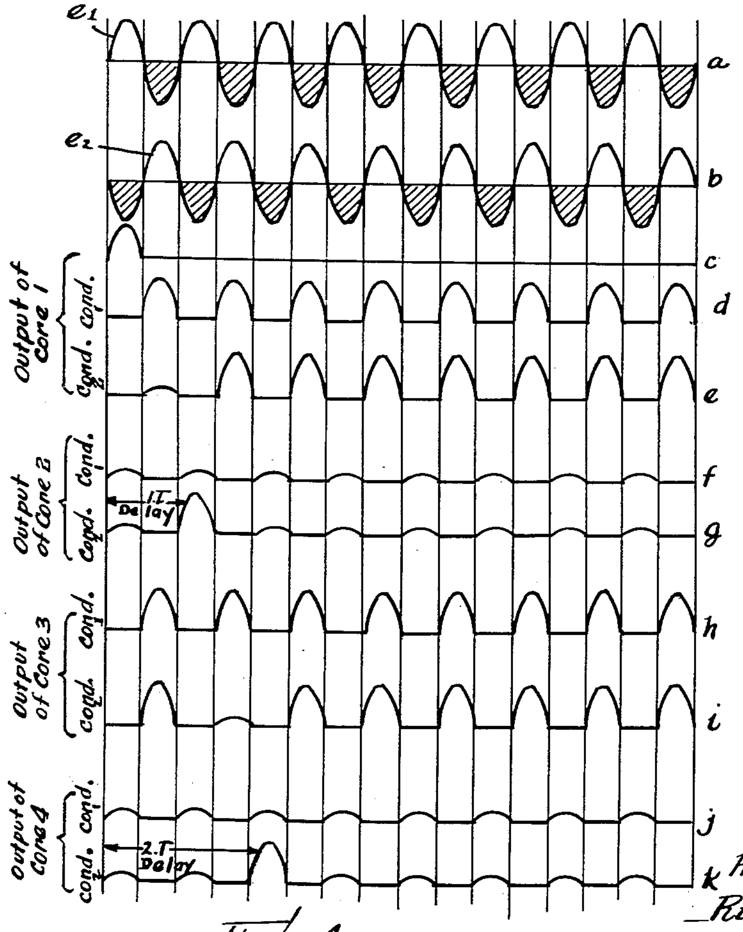
Fig. 4 shows the various waveforms in the magnetic core delay circuit shown in Fig. 2, both before and after the reception of a single input pulse.

The present invention utilizes a novel pulse delay circuit. The delay means 49, 59 and 66 are formed of unique magnetic core units of the kind described in copending application Serial No. 658,657, filed May 13, 1957. Refer now to Fig. 2, which illustrates an arrangement of such magnetic core units which form a delay means, as for example the delay means 49 in Fig. 1. Four cascaded magnetic core units 49–1, 49–2, 49–3, and 49–4 are shown. Each of these units includes a ring-shaped core of magnetic material having a rectangular hysteresis characteristic, as shown in Fig. 4. The core has an input winding 102, an output winding 104, the output winding having many more turns than the primary winding, for example, five times the number of windings in the primary winding. The upper end of the input winding 102 is connected through a current-limiting resistor 106 and a rectifier 108 to a signal input terminal 110, which may be a plug-in terminal where each magnetic core unit is a plug-in unit. The bottom end of the input winding 102 is connected through an input resistor 112, which may be of the same value as resistor 106, to a plug-in terminal 114 which is grounded. The end of the resistor 112 which joins the input winding 102 is also connected to a plug-in terminal 116, which may be referred to as a signal inhibit terminal. The upper end of the output winding 104 is connected to an output plug-in terminal 118 and the bottom end of the output winding is connected to a plug-in terminal 120. The upper terminal 118 of each magnetic core unit is connected to the input terminal 110 of the following unit. The bottom output terminal 120 of each core unit is connected to a source of alternating current voltage 122 or 124 depending upon the position of the core unit in the circuit. The voltage output of the alternating voltage source 122 is shown in Fig. 4*b* and the output voltage of the alternating current voltage source 125 is shown in Fig. 4*a*. The voltage outputs of these two sources are 180 degrees out of phase with one another. Voltage source 122 is connected to the bottom output terminal 120 of the odd numbered core units 49–1, 49–*a*, etc, and voltage source 124 is connected to the terminal 120 of the even numbered core units 49–2, 49–4, etc. Each of the voltage sources 122 and 124 are connected in separate loop circuits including the output circuit and the input circuit of successive core units. Rectifiers 108 in these loop circuits are arranged to pass the positive pulses of the outputs of these voltage sources.

Figure 3:
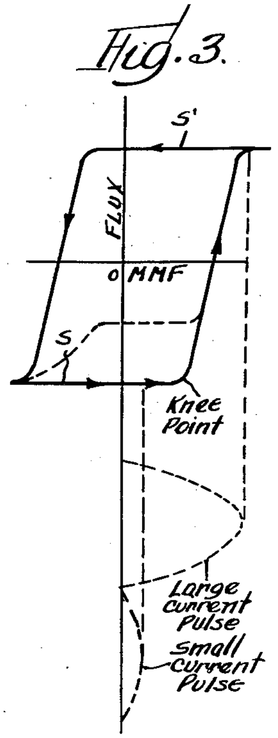
Fig. 3 shows the hysteresis curve of a rectangular-type magnetic core, such as used with the various matrix and transformer cores illustrated in Figs. 1 and 2.

In order to understand the operation of these core units, it is necessary to assume that the winding of a core unit whose core has a rectangular hysteresis characteristic as shown in Fig. 3 acts as a high impedence when the current flowing in the winding is in a direction to drive the core from one state of saturation to the opposite state of saturation, and acts as a low impedence when the current flowing therethrough is in a direction to maintain the state of saturation of the core. From this, it can be seen that the impedence which an output core winding 104 will offer the positive pulsations of the outputs of the voltage sources 122 and 124 will be relatively small when the current resulting therefrom tends to maintain the saturation of the core associated with the output winding involved.

For a given loop circuit, the connections to the windings 104 and 102 therein are such that the flow of current resulting from the positive pulsations is in a direction to drive the cores associated with the windings 104 and 102 to opposite states of saturation. Thus, considering the loop circuit involving the core units 49–1 and 49–2, and assuming that a positive current pulsation from source 122 is in a direction to drive or maintain the core 100 of the core unit 49–1 in a first or reference state of saturation, the pulsation will tend to drive the core 100 of the following core unit 49–2 to a second or opposite state of magnetic saturation. When the saturation of the core 100 of the first core unit 49–1 is being maintained, a relatively large current will flow in the loop circuit involved, and this large current flowing through the small number of turns of the primary input winding 102 of the core unit 49–2 will be sufficient to drive such core from its first to its second or opposite state of saturation. One-half cycle later, the output winding 104 of the core unit 49–*a* will receive a positive pulsation from the voltage source 124 which will be in the direction to drive the latter core 100 from its second back to its reference state of saturation. Since, in such case, the winding 104 of the core unit 49–*a* acts as a high impedance, only a small current flow will result therefrom, which small current flow is insufficient to drive the following core 100 of the core unit 49–3 to the second or opposite state of magnetic saturation.

It can thus be seen that where no input pulse is fed to the first core unit 49–1, the output condition of the first core unit will be one of positive pulses of relatively large magnitude representing a signal output correction, and the output of the following core unit 49–2 consists of relatively small pulses which will represent a no-signal output condition. Initially, the output conditions of the odd numbered stages 49–1, 49–3, etc., before an input pulse has been fed to the first core unit 49–1, will be a signal output condition, and the even numbered core units 49–2, 49–4, etc., will initially be in a no-signal output condition. Fig. 4*d* represents the initial signal current output conditions of the odd numbered cores, and Fig. 4*f* represents the initial signal output conditions of the even numbered core units. No negative current pulsations are shown because it is assumed that the rectifiers 108 of the various core units substantially reduce the negative current flow to zero during the negative going portions of the outputs of the voltage sources 122 and 124.

The operation of the circuit shown in Fig. 2 as a delay circuit will now be explained. When a positive input current pulse shown in Fig. 4*c* is fed to the signal input terminal 110 of the first core unit 49–1, such pulsation occurring one-half cycle before the positive going pulsation of the voltage source 122 associated with the output of the first core unit 49–1, the output current condition of the core unit 49–1 will be that shown in Fig. 4*e*. Such positive input pulse fed to the input of the core unit 49–1 will drive the core 100 thereof from its reference to its second state of saturation so that during the next half cycle when a positive current pulse is fed to the output winding 104 thereof from the voltage source 122, the core 100 will be returned to its first or reference state of saturation. Since the state of saturation of the core 100 of the first core unit is being reversed, as above explained, the impedance of the output winding 104 thereof will be large so that the resultant current pulse from the latter positive pulse will be relatively small, and this small pulsation is insufficient to drive the core 100 to its opposite state of saturation; in fact, it is insufficient to drive the core even to the knee point of the hysteresis characteristic thereof, as illustrated in Fig. 3. In such case, the core 100 of the second core unit 49*a* will not be driven to its second state of saturation as before, so that the next half cycle later when a positive pulsation is fed to the output winding thereof from voltage source 124, the state of saturation thereof will not be reversed but will be merely maintained in its reference state of magnetic saturation. Since the output winding 104 thereof will then offer a low impedance, a relatively large current pulsation will result which is sufficient to drive the core 100 of the following core unit 49–3 from its reference to its opposite state of saturation. It is thus apparent, that as a result of the feeding of a single input pulse to the first core unit 49–1, that the signal output conditions of the various core units will change in sequence. That is, the changing of the output condition of one core unit will, one-half cycle later, change the output condition of the following core unit, etc., which constitutes the desired delay action. For any core unit, this change will last for only one operating cycle, so that one cycle after the output condition of a core has been changed it will revert to its original output condition and remain there until the first core unit is again pulsed. This can be better understood by following the sequence of operation of the cores illustrated in Fig. 4.

Normally, no signal (i.e. low current) conditions exist at the inputs to the odd numbered core units or the outputs of the even numbered core units. These points constitute the various delay line terminals 50–50′, 52–52′, etc., of the delay means 49. When the delay means receives its start or input pulse, such input pulse appears at the input to the core unit 49–1 and hence terminal 50 of the delay means which is connected to the input terminal 110 thereof. One cycle latter, that is at period 1T, a large current pulse will appear at the input of the third core unit 49–3 (the output of the second core unit 49–2) to which the second terminal 50′ is connected.

Figure 6:
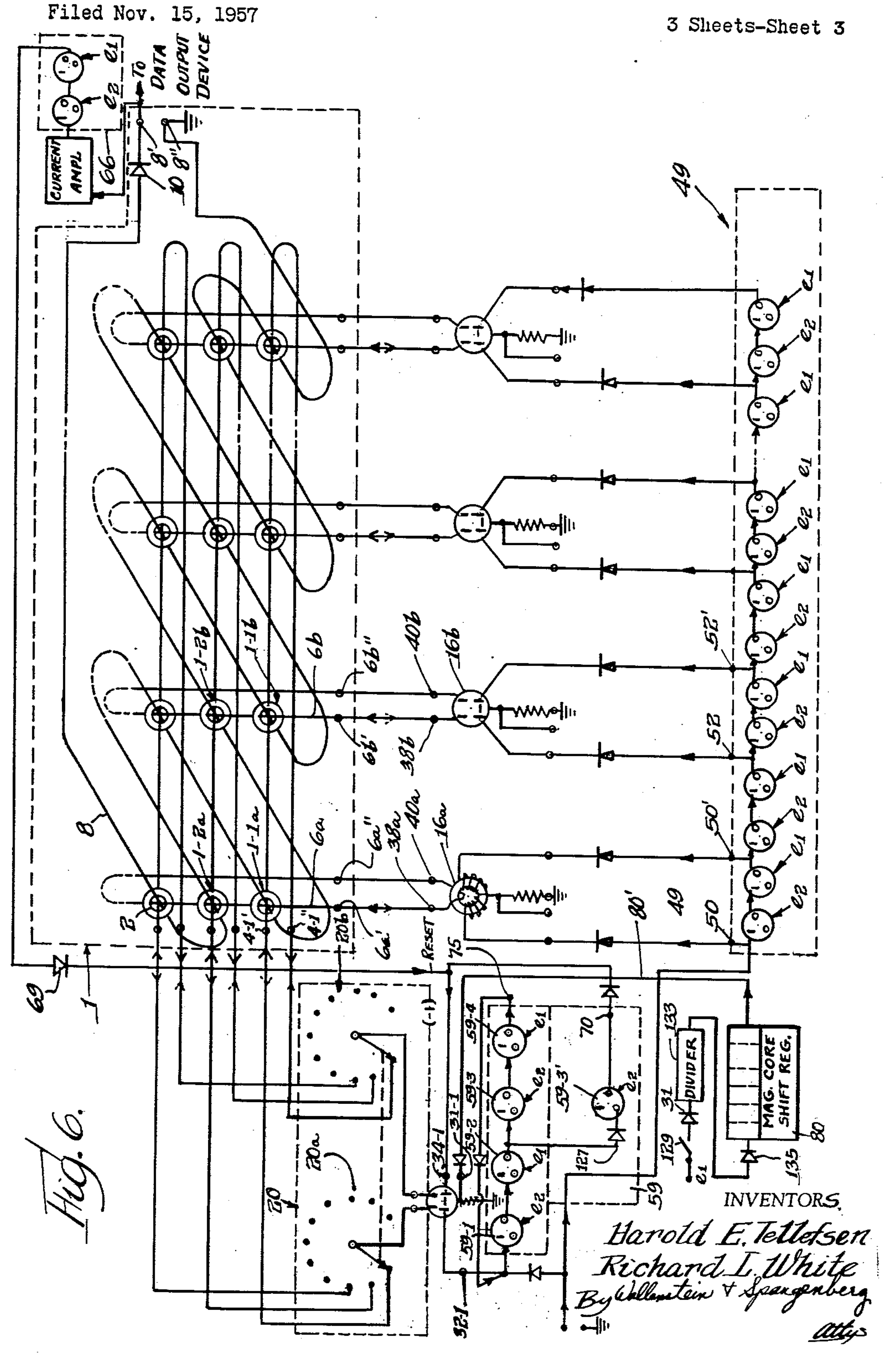
Fig. 6 is a somewhat more detailed schematic diagram of the circuit shown in Fig. 1.

Fig. 5 shows a schematic representation of the various core units shown in Fig. 2, which schematic representation has been utilized in the more detailed diagram of the system shown in Fig. 6. As shown in Fig. 5, each core unit including its rectifier 108 and resistors 106 and 112 are represented by a circle having a symbol 1 representing the input terminal 110, a symbol 0 below the 1 representing the inhibit input terminal 116, another symbol 0 at the upper right hand end of the circle representing the output terminal 118, and a point to which an arrow extends representing the bottom output terminal 120. The ground connected terminals of these core units has been omitted for purposes of simplicity. In a somewhat analogous way, the various differential transformer units have been schematically represented in Fig. 6. The symbols 1 in the upper portions of the circles there shown respectively represent the terminals of the output winding of the transformer unit involved, with the symbol 1 at the lower left hand corner of the circle representing the terminal connected to the upper end of the said input winding thereof and the symbol −1 at the lower right hand corner of each transformer unit circle represents the terminal connecting to the upper end of the reset winding of the transformer unit involved. The negative symbol (−) indicates that a pulse applied at this point results in an output pulse of opposite polarity to that produced when the same pulse is applied to the other input terminal. Unlike the schematic representation of the core units of the delay means, the symbolic representation of the transformer units does not include the inhibit input impedence thereof.

The delay and pulse circulating means 59 in Fig. 6 is shown in schematic form as comprising four core units 59–1, 59-2, 59–3 and 59–4 arranged substantially identical to the core units 49–1, 49–2, 49–3 and 49–4 previously described. Since the input and output conditions of these four core units are identical to that described with respect to the circuit shown in Fig. 2, a further detailed description of its operation will not be given. As previously indicated, output terminal 70 provides a pulse spaced 1½T, that is, one and a half cycles, from the occurrence of the input pulse to the delay circuit means 59. It was accordingly necessary to add an additional core unit 59–3′ which is driven from the output of the second core unit 59–2. Instead of connecting the output terminal (118) of the second core unit 59–2 to the signal input terminal (110) of the core unit 59–3′, the latter output terminal is connected to the inhibit input terminal (116) of core unit 59–3′ through a rectifier 127 which passes only positive pulses. The voltage source 124 identified by the symbol $e1$ is fed to the upper signal input terminal (110) of the core unit 59–3′ and the other voltage source 122 is fed to lower output terminal (120) of the core unit 59–3′. It can be seen that the positive current pulsations from the source $e1$ or 124 are continuously fed to the upper signal input terminal (110) so that normally it would be expected that a no-signal output condition would be present for the core unit 59–3′. A single relatively large positive pulsation appears in the output of the core unit 59–3′, however, when the inhibit input terminal (116) thereof receives a pulse from the output of the core unit 59–2. As is apparent, the output of the core unit 59–2 provides a relatively large current pulsation at 1T following the feeding of an input pulse to the delay means 59. When this occurs, the core of the core unit 59–3′ is not triggered from its reference to its opposite state of saturation, so that the following half cycle when the voltage source $e2$ or 122 generates its positive pulsation, the saturated state of the associated core will be maintained thereby producing a relatively large pulsation at the output of the core unit 59–3′ at time 1½T. This pulsation appears at output terminal 70 and is fed to the reset input terminal 34–1 of the row differential transformer unit 16–1.

As is apparent, a pulse appears at the output of the fourth core unit 59–4 at 2T following the feeding of the input pulse to delay means 59, and this pulse is recirculated back into the input of the first core unit 59–1.

Fig. 6 also illustrates a circuit by means of which the magnetic core shift register 80 may obtain shift pulses at the proper times, that is, at the times that the reset pulses are fed to the reset windings of the various transformer units. It is apparent from Fig. 6 that the reset windings of the various transformer units 16*a*, 16*b*, etc., are pulsed coincident with the positive pulsation of the voltage source 124 or $e1$. However, the time interval between resetting pulsations is a period 2T, or every two cycles of operation of the voltage source $e1$. Thus, the voltage source $e1$ may be fed through a switch 129, which is closed only during a read-in operation, and a rectifier 131 leading to a pulse divider 133 which feeds one pulse to its output for each two pulses fed to its input. The output of the pulse divider 133 may therefore be fed through rectifier 135 to the input of the magnetic core shift register 80. Pulses fed from the divider 133 are shift pulses which operate in the manner above explained in connection with this explanation of Fig. 1.

Since an overall explanation of the operation of the system has been given previously in connection with Fig. 1, a further description of the operation will not now be given.

It should be understood that numerous modifications may be made of the preferred form of the invention above described without deviating from the broader aspects of the invention. For example, the present invention is applicable in its broader aspects to a core system having one magnetic core storage unit or one row of magnetic core storage units, and wherein each magnetic core storage unit has only one input winding and only one differential transformer unit per magnetic core storage unit, rather than the two above described.

We claim:

1. In a magnetic core memory matrix system of the type including a series of column magnetic core units each having column input windings which are adapted to drive the associated core to a first state of magnetic saturation when driven by set pulses of a given amplitude and polarity and to the opposite state of magnetic saturation when driven by reset pulses of a given amplitude and opposite polarity, the improvement comprising: a column transformer unit for each column of core units, each of said transformer units comprising a core of magnetic material and set, reset, and output winding means on said core, the output winding means of each column transformer unit being connected to the column input windings of the associated column of core units, said set and reset winding means of each transformer unit respectively producing said set and reset pulses in the associated output winding means when respectively separately energized by activating control pulses of a given polarity and amplitude, delay means associated respectively with said column transformer units, said delay means having a number of output terminals at which activating control pulses appear in time sequence upon the feeding of a signal input pulse to the delay means, and means connecting said set and reset winding means to successive output terminals of said delay means, so that activating control pulses are fed in time sequence to the set and reset winding means of the column transformer units.

2. In a magnetic core memory matrix system of the type including a series of column magnetic core units each having column input windings which are adapted to drive the associated core to a first state of magnetic saturation when driven by set pulses of a given amplitude and polarity and to the opposite state of magnetic saturation when driven by reset pulses of a given amplitude and opposite polarity, the improvement comprising: a column transformer unit for each column of core units, each of said transformer units comprising a core of magnetic material and set, reset, and output winding means on said core, the output winding means of each column transformer unit being connected to the column input winding means of the associated column of core units, said set and reset winding means of each transformer unit respectively producing said set and reset pulses in the associated output winding means when respectively separately energized by activating control pulses of a given polarity and amplitude, delay means associated respectively with said column transformer units, said delay means having a number of output terminals at which activating control pulses appear in equally spaced time sequence upon the feeding of a signal input pulse to the delay means, and means connecting said set and reset winding means of each column transformer unit to successive output terminals of said delay means with the set and reset windings of the different column transformer units connected to different output terminals of said delay means in the same order as the associated column of core units, so that activating control pulses are fed in time sequence to the set and reset winding means of each column transformer unit and the column transformer units as a whole in the order of the associated column.

3. The combination of claim 2 wherein said delay means comprises a number of cascaded magnetic core bistable units, each unit being adapted to provide a signal and a no-signal output condition responsive respectively to a signal and no-signal input condition, means coupling the output of each bistable unit to the input of the next bistable unit, whereby alternate bistable units normally have a no-signal output condition and the intervening alternate bistable units have a signal output condition, means for feeding said signal input pulse therefor to the input of the first bistable unit to effect the progressive reversal for one cycle of the signal output conditions of said cascaded bistable units, whereby the bistable units normally having a no-signal input condition progressively momentarily change to a signal condition, and means connecting said signal terminals of the delay means to the respective inputs of the associated bistable units at which a no-signal condition normally exists.

4. In a magnetic core memory matrix system of the type including a series of row and column magnetic core units each having row and column input windings which are adapted to drive the associated core to a first state of magnetic saturation when simultaneously driven by set pulses of a given amplitude and polarity and to the opposite state of magnetic saturation when simultaneously driven by reset pulses of a given amplitude and opposite polarity, and an output winding coupled to a common matrix output and in which output pulses are generated upon the change of the state of magnetic saturation of the core, the improvement comprising: a row transformer unit for a selected row of core units, a column transformer unit for each column of core units, each of said transformer units comprising a core of magnetic material and set, reset, and output windings on said core, the output winding of each row and column transformer unit being connected to the associated row and column input windings of the associated row and column of core units, said set and reset windings of each transformer unit respectively producing said set and reset pulses in the associated output winding when respectively separately energized by activating control pulses of a given polarity and amplitude, first delay means associated with said column transformer units, said first delay means having a number of output terminals at which activating control pulses appear in time sequence upon the feeding of a signal input pulse to the delay means, means connecting said set and reset windings of each column transformer unit to successive output terminals of said first delay means with the set and reset windings of the different column transformer units connected to different output terminals of said first delay means in the same order as the associated column of core units, so that activating control pulses are fed in time sequence to the set and reset windings of each column transformer unit, and the column transformer units as a whole in the order of the associated column, and second time delay means including means responsive to the generation of the output pulses in said common matrix output for feeding activating control pulses to the set and reset windings of said row transformer unit in synchronism with the feeding of said activating control pulses to the set and reset windings of said column transformer units.

5. In a magnetic core memory matrix system of the type including a series of row and column magnetic core units each having row and column input windings which are adapted to drive the associated core to a first state of magnetic saturation when simultaneously driven by set pulses of a given amplitude and polarity and to the opposite state of magnetic saturation when simultaneously driven by reset pulses of a given amplitude and opposite polarity, and an output winding coupled to a common output and in which output pulses are generated upon the change of the state of magnetic saturation of the core, the improvement comprising: a row transformer unit for a selected row of core units, a column transformer unit for each column of core units, each of said transformer units comprising a core of magnetic material having set, reset, and output windings on said core, the output winding of each row and column transformer unit being connected to the row and column input windings of the associated row and column of core units, said set and reset windings of each transformer unit respectively producing said set and reset pulses in the associated output winding when respectively separately energized by activating control pulses of a given polarity and amplitude, first delay means associated respectively with said row and column transformer units, said first delay means having a number of output terminals at which activating control pulses appear in equally spaced time sequence upon the feeding of a signal input pulse to the delay means, means connecting said set and reset windings of each column transformer unit to corresponding successive output terminals of said first delay means, so that activating control pulses are fed in time sequence to the set and reset windings of each column transformer unit, and the column transformer units as a whole in the order of the associated column, and second delay means having a set pulse terminal connected to the set input winding of the row transformer unit and a feedback pulse terminal connected to said set pulse terminal, and at which terminals activating control pulses appear in time sequence in synchronism with the occurrence of activating control pulses at the set input windings of adjacent column transformer units, wherein a pulse appearing at the feedback terminal is fed back to the set pulse terminal as an activating control pulse reaches the set input winding of a column transformer unit, and third delay means responsive to an output pulse generated at said common output of the magnetic core matrix for feeding an activating control pulse to the reset winding of said row transformer unit in synchronism with the receipt of an activating control pulse by the reset windings of each of the column transformer units.

6. In a magnetic core memory matrix system of the type including a series of row and column magnetic core units each having row and column input windings which are adapted to drive the associated core to a first state of magnetic saturation when simultaneously driven by set pulses of a given amplitude and polarity and to the opposite state of magnetic saturation when simultaneously driven by reset pulses of a given amplitude and opposite polarity, and an output winding coupled to a common output and in which output pulses are generated upon the change of the state of magnetic saturation of the core, the improvement comprising: a row transformer unit for a selected row of core units, a column transformer unit for each column of core units, each of said transformer units comprising a core of magnetic material having set, reset, and output windings on said core, the output winding of each row and column transformer unit being connected to the row and column input windings of the associated row and column of core units, said set and reset windings of each transformer unit respectively producing said set and reset pulses in the associated output winding when respectively separately energized by activating control pulses of a given polarity and amplitude, first delay means associated respectively with said row and column transformer units, said first delay means having a number of output terminals at which activating control pulses appear in equally spaced time sequence upon the feeding of a signal input pulse to the delay means, means connecting said set and reset windings of each column transformer unit to corresponding successive output terminals of said first delay means, so that activating control pulses are fed in time sequence to the set and reset windings of each column transformer unit, and the column transformer units as a whole in the order of the associated column, and second delay means having a set pulse terminal connected to the set input winding of the row transformer unit and a feedback pulse terminal connected to said set pulse terminal, and at which terminals activating control pulses appear in time sequence in synchronism with the occurrence of activating control pulses at the set input windings of adjacent column transformer units, wherein a pulse appearing at the feedback terminal is fed back to the set pulse terminal as an activating control pulse reaches the set input winding of a column transformer unit, said second delay means further having a reset pulse terminal connected to the reset winding of the row transformer unit and at which an activating control pulse appears at a time between the occurrence of activating control pulses at the set and reset windings of each of the column transformer units, whereby the row transformer unit may be reset independently of the column transformer unit in the absence of the generation of an output pulse in the magnetic core matrix, and third delay means responsive to an output pulse generated at said common output of the magnetic core matrix for feeding an activating control pulse to the reset winding of said row transformer unit in synchronism with the receipt of an activating control pulse by the reset windings of each of the column transformer units.

7. The matrix system of claim 1 wherein the set and reset windings of said transformer units are differentially wound and have separate ends leading to different output terminals of said delay means, and said delay means providing pulses of the same polarity at said output terminals, the differential winding of the set and reset windings producing set and reset pulses of opposite polarity.

8. The matrix system of claim 1 wherein the set and reset windings of said transformer units are differentially wound and having corresponding ends leading to different output terminals of said delay means, the other ends of the set and reset windings of at least some of said transformer units being connected together, an inhibit input impedance connected in series with said connected together winding ends, and said delay means providing pulses of the same polarity at said terminals thereof, the differential winding of the set and reset windings providing said set and reset pulses of opposite polarity.

References Cited in the file of this patent

UNITED STATES PATENTS

| | | |
|---|---|---|
| 2,691,157 | Stuart-Williams | Oct. 5, 1954 |
| 2,708,722 | An Wang | May 17, 1955 |
| 2,734,187 | Rajchman | Feb. 7, 1956 |
| 2,776,419 | Rajchman | Jan. 1, 1957 |
| 2,805,409 | Mader | Sept. 3, 1957 |
| 2,882,517 | Warren | Apr. 14, 1959 |